No. 708,638. Patented Sept. 9, 1902.
S. HETHERINGTON.
ANIMAL TRAP.
(Application filed Mar. 25, 1902.)
(No Model.)
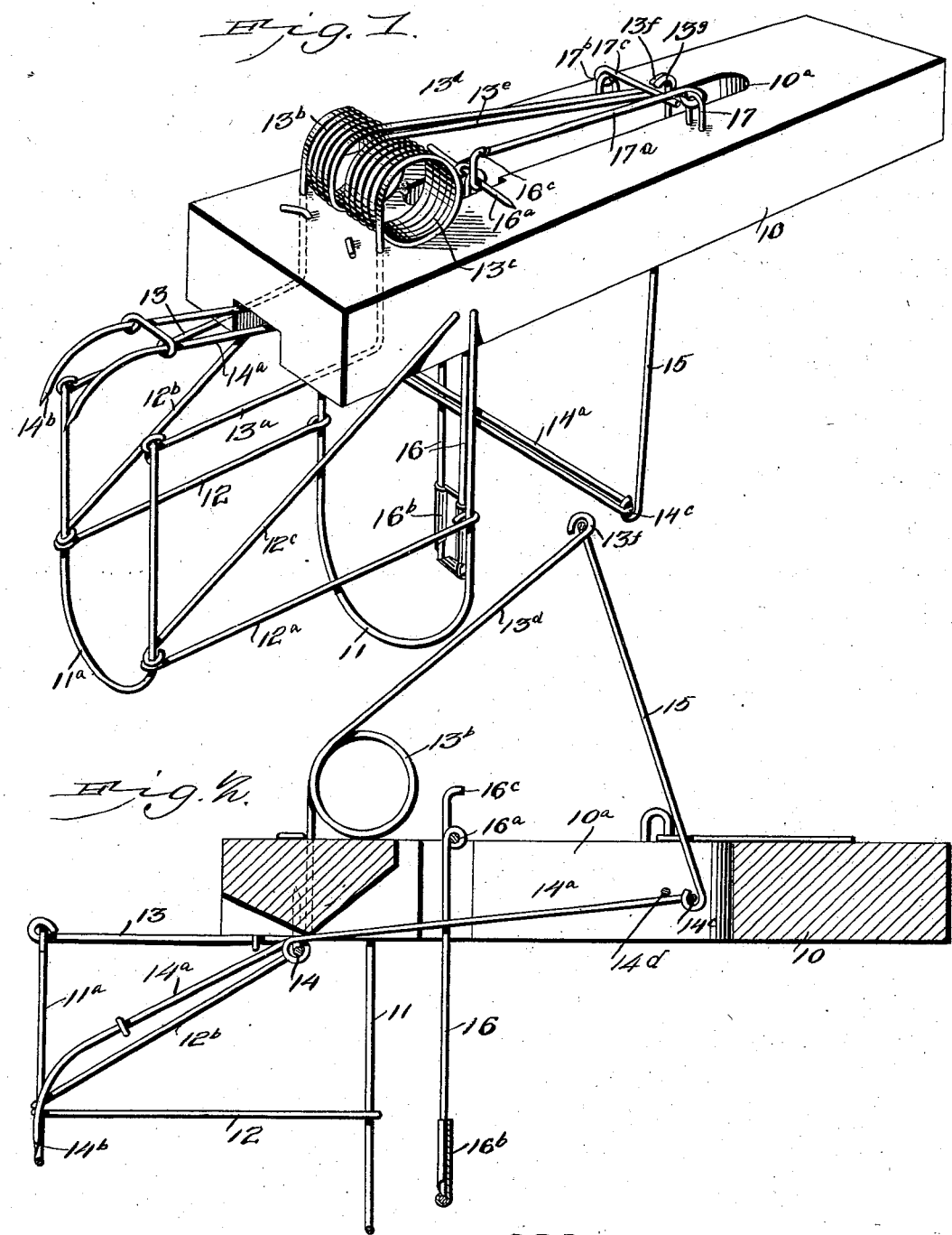

UNITED STATES PATENT OFFICE.

SAM HETHERINGTON, OF REAGAN, TEXAS.

ANIMAL-TRAP.

SPECIFICATION forming part of Letters Patent No. 708,638, dated September 9, 1902.

Application filed March 25, 1902. Serial No. 99,907. (No model.)

*To all whom it may concern:*

Be it known that I, SAM HETHERINGTON, a citizen of the United States, residing at Reagan, in the county of Falls and State of Texas, have invented a new and useful Animal-Trap, of which the following is a specification.

This invention relates to animal-traps; and it consists in certain novel features of the construction, as hereinafter shown and described, and particularly specified in the claims.

The device may be employed in destroying many species of animals, but is more particularly designed for use in destroying the animals known as "salamanders" and other burrowing animals and will be set in the entrances to the holes or burrows of such animals.

In the drawings illustrative of the invention, Figure 1 is a perspective view of the trap "set" or ready for action. Fig. 2 is a longitudinal sectional elevation showing the trap sprung.

The animal-impaling mechanism will be mounted on a base 10, having a longitudinal aperture $10^a$ and preferably depending therefrom, so as to be inserted into the entrance or mouth of the burrow of the animal. Attached to the base 10 and depending therefrom is a wire cage open at the ends and forming a "runway" for the animal. This cage is formed of an inner loop 11, an outer loop $11^a$, lower horizontal bars 12 $12^a$, connecting the loops, brace-bars $12^b$ $12^c$, connecting the loop $11^a$ to the base 10, and upper horizontal bars 13 $13^a$, connecting the upper ends of the loop $11^a$ to the base, the inner ends of the bars 13 $13^a$ passing upward through the base and formed into coils $13^b$ $13^c$ above the base, as shown.

The inner ends of the coils are extended in the form of bars $13^d$ $13^e$, terminating in eyes $13^f$ $13^g$.

Pivotally supported at 14 to the under side of the base 10 is the animal-impaling means, consisting of an arm $14^a$, having one end curving downward and sharpened, as at $14^b$, and the other end extended rearwardly and ending in a loop $14^c$ and adapted to operate in the aperture $10^a$ when in its "sprung" position, as shown in Fig. 2. Connecting the loop end $14^c$ of the arm $14^a$ to the eyes $13^f$ $13^g$ of the spring-bars $13^d$ $13^e$ is a rod 15. By this means the force of the spring-coils $13^b$ $13^c$ are exerted to maintain the points $14^b$ in their downward position, as shown in Fig. 2, a stop-bar $14^d$ being inserted across the cavity $10^a$ to limit the movement of the arm $14^a$, as shown in Fig. 2.

A trigger mechanism is arranged to release the bar $14^a$, consisting of a depending arm 16, pivotally connected at $16^a$ to the base 10 and preferably having a plate $16^b$ upon its lower end and with its upper end bent off at right angles, as shown at $16^c$.

The bar 16 hangs just in the rear of the loop 11, as shown. Pivotally connected at 17 to the base 10 is a catch-bar $17^a$, and likewise pivotally connected to the base 10 at $17^b$ is another shorter catch-bar $17^c$, the latter adapted to engage the spring-bars $13^d$ $13^e$ when depressed and also adapted to be engaged by the longer catch-bar $17^a$, while the longer catch-bar in turn is adapted to engage the angular end $16^c$ of the trip-arm. By this means the spring-arms are held depressed and by their connection with the arm $14^a$ hold the ends $14^b$ elevated, as in Fig. 1, ready to be released by any movement of the trigger-bar 16, as will be readily understood.

The trap will be set so that the animal will enter the guideway through the loop $11^a$, and when he moves the trip-arm 16 the spring-bars will be released and the animal will be impaled by the sharp points $14^b$. The plate $16^b$ extends the trigger-arm 16 laterally, so as to increase the area and prevent any possibility of the animal working past it without operating it.

Most burrowing animals like salamanders and gophers close their burrows by forcing the earth ahead of them, and when the trap is properly set in the entrance to the burrows of such animals any attempt to pass the trip-bar 16 or to crowd earth past it will trip it and actuate the trap. The trap will thus be very effective and act with certainty and precision.

The parts all being of wood and of wire (preferably steel) can be manufactured very cheaply and strongly.

The formation and arrangement of the parts may be changed in minor details without affecting the operation or departing from the spirit or scope of the invention.

Having thus fully described my invention, what I claim as new, and desire to secure by Letters Patent, is—

1. In an animal-trap, a base-plate, a runway connected with said base-plate and formed by the wire cage open at the ends and wires forming the top member of said cage, said wires being extended through the base, turned into spring-coils and having connected ends forming an arm whereby the impaling device is actuated, substantially as set forth.

2. In an animal-trap, a pair of spring-coils having their inner connected ends extended to form an arm and having their outer ends extended vertically through a base supporting said coils and thence forwardly to form the upper members of a cage or runway, combined with a vibrating impaling device mounted pivotally between the top members of the runway, a rod connecting the rear end of said impaling device with the arm formed by the connected ends of the coiled springs, and suitable trigger mechanism, substantially as set forth.

3. In an animal-trap, a base-plate, a runway formed of a wire cage open at the ends and with the upper members extended through said base and turned into spring-coils and with spring-arms extending from said spring-coils, an impaling-bar movably connected to said base and operating in said runway, a rod connecting the inner end of said impaling-bar to said spring-arms, and a yieldable trigger mechanism operating from within said runway and adapted to actuate said releasing means, substantially as described.

In testimony that I claim the foregoing as my own I have hereto affixed my signature in the presence of two witnesses.

SAM HETHERINGTON.

Witnesses:
G. W. SHAUNFIELD,
E. W. SHAUNFIELD.